US012639216B2

(12) United States Patent
Arepalli et al.

(10) Patent No.: US 12,639,216 B2
(45) Date of Patent: May 26, 2026

(54) UNIVERSAL FLASH STORAGE CONTROLLER BASED POWER MANAGEMENT QUALITY OF SERVICE PROCESSOR VOTING

(71) Applicant: QUALCOMM Incorporated, San Diego, CA (US)

(72) Inventors: Naveen Kumar Goud Arepalli, Hyderabad (IN); Nitin Rawat, Gumla (IN); Manish Pandey, Bhopal (IN); Santhosh Reddy Akavaram, Hyderabad (IN); Sang Tran, Encinitas, CA (US); Bhaskar Valaboju, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 18/949,091

(22) Filed: Nov. 15, 2024

(65) Prior Publication Data

US 2026/0140866 A1     May 21, 2026

(51) Int. Cl.
*G06F 12/02* (2006.01)
*G06F 1/3234* (2019.01)
*G06F 3/06* (2006.01)

(52) U.S. Cl.
CPC ........ *G06F 12/0246* (2013.01); *G06F 1/3275* (2013.01); *G06F 3/0611* (2013.01); *G06F 3/0625* (2013.01); *G06F 3/0634* (2013.01); *G06F 3/0679* (2013.01); *G06F 2212/1028* (2013.01)

(58) Field of Classification Search
None
See application file for complete search history.

(56) References Cited

U.S. PATENT DOCUMENTS

| | | | | |
|---|---|---|---|---|
| 2015/0074436 A1* | 3/2015 | Jain | ......................... | G06F 1/324 |
| | | | | 713/300 |
| 2016/0050111 A1* | 2/2016 | Jang | ................... | H04L 43/0888 |
| | | | | 709/221 |

(Continued)

OTHER PUBLICATIONS

"Ufshcd.c." Mar. 2022. https://android.googlesource.com/kernel/msm/+/refs/heads/android-msm-sunfish-4.14-t-beta-3/drivers/scsi/ufs/ufshcd.c.*

(Continued)

*Primary Examiner* — Nathan Sadler
(74) *Attorney, Agent, or Firm* — Harrity & Harrity, LLP

(57) ABSTRACT

Various aspects of the present disclosure generally relate to universal flash storage (UFS) devices. In some aspects, a UFS controller may receive, from a UFS driver, a command associated with a storage transaction for an application that runs on a processor. The UFS controller may identify, from the command, a data transfer size associated with the command. The UFS controller may identify, from a register, a power management quality of service (PM-QoS) control data transfer size. The UFS controller may send, to the processor, a PM-QoS processor vote based at least in part on the data transfer size associated with the command in relation to the PM-QoS control data transfer size, wherein the PM-QoS processor vote prevents the processor from entering a low power state until the storage transaction is completed. Numerous other aspects are described.

20 Claims, 6 Drawing Sheets

300

(56)  References Cited

U.S. PATENT DOCUMENTS

| | | | |
|---|---|---|---|
| 2020/0341825 A1 | 10/2020 | Sudarmani et al. | |
| 2021/0279186 A1* | 9/2021 | Kunt | G06F 3/0653 |
| 2021/0318890 A1* | 10/2021 | Chang | G06F 3/0659 |
| 2025/0044940 A1* | 2/2025 | Zinger | G06F 3/0679 |

OTHER PUBLICATIONS

"Ufshcd.h" May 2021. https://android.googlesource.com/kernel/msm/+/refs/heads/android-msm-sunfish-4.14-t-beta-3/drivers/scsi/ufs/ufshcd.h.*

"Ufs-qcom.c" Jul. 2020. https://android.googlesource.com/kernel/msm/+/refs/heads/android-msm-sunfish-4.14-t-beta-3/drivers/scsi/ufs/ufs-qcom.c.*

"Ufs-qcom.h" Apr. 2020. https://android.googlesource.com/kernel/msm/+/refs/heads/android-msm-sunfish-4.14-t-beta-3/drivers/scsi/ufs/ufs-qcom.h.*

"Pm_qos_interface.rst." Feb. 2020. https://git.kernel.org/pub/scm/linux/kernel/git/torvalds/linux.git/tree/Documentation/power/pm_qos_interface.rst?id=3c87402771f2bc38ee92eb506bb58e4fc4a5b8b9.*

International Search Report and Written Opinion—PCT/US2025/052215—ISA/EPO—Dec. 22, 2025.

JEDEC Standard: "Universal Flash Storage (UFS), Version 3.1", JEDEC—JEDEC Solid State Technology Association, vol. JESD220E, Jan. 1, 2020, 421 Pages, XP009541917, The Whole Document.

* cited by examiner

100

600

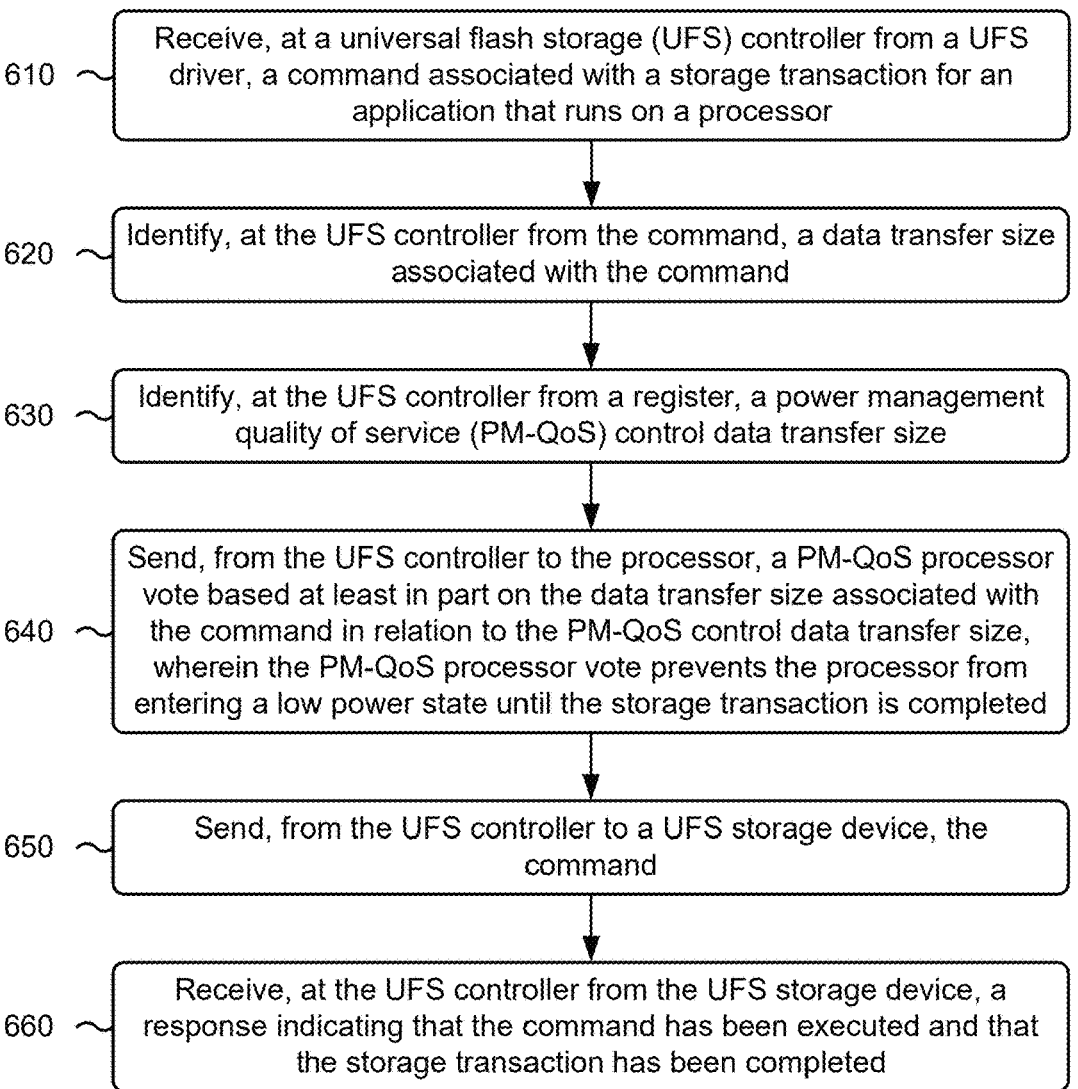

610 Receive, at a universal flash storage (UFS) controller from a UFS driver, a command associated with a storage transaction for an application that runs on a processor 620 Identify, at the UFS controller from the command, a data transfer size associated with the command 630 Identify, at the UFS controller from a register, a power management quality of service (PM-QoS) control data transfer size 640 Send, from the UFS controller to the processor, a PM-QoS processor vote based at least in part on the data transfer size associated with the command in relation to the PM-QoS control data transfer size, wherein the PM-QoS processor vote prevents the processor from entering a low power state until the storage transaction is completed 650 Send, from the UFS controller to a UFS storage device, the command 660 Receive, at the UFS controller from the UFS storage device, a response indicating that the command has been executed and that the storage transaction has been completed

FIG. 6

UNIVERSAL FLASH STORAGE CONTROLLER BASED POWER MANAGEMENT QUALITY OF SERVICE PROCESSOR VOTING

FIELD OF THE DISCLOSURE

Aspects of the present disclosure generally relate to memory devices and, for example, to a universal flash storage (UFS) controller based power management quality of service (PM-QoS) processor voting.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

SUMMARY

In some implementations, a universal flash storage (UFS) controller includes one or more components configured to: receive, from a UFS driver, a command associated with a storage transaction for an application that runs on a processor; identify, from the command, a data transfer size associated with the command; identify, from a register, a power management quality of service (PM-QoS) control data transfer size; send, to the processor, a PM-QoS processor vote based at least in part on the data transfer size associated with the command in relation to the PM-QoS control data transfer size, wherein the PM-QoS processor vote prevents the processor from entering a low power state until the storage transaction is completed; send, to a UFS storage device, the command; and receive, from the UFS storage device, a response indicating that the command has been executed and that the storage transaction has been completed.

In some implementations, a method includes receiving, at a UFS controller from a UFS driver, a command associated with a storage transaction for an application that runs on a processor; identifying, at the UFS controller from the command, a data transfer size associated with the command; identifying, at the UFS controller from a register, a PM-QoS control data transfer size; sending, from the UFS controller to the processor, a PM-QoS processor vote based at least in part on the data transfer size associated with the command in relation to the PM-QoS control data transfer size, wherein the PM-QoS processor vote prevents the processor from entering a low power state until the storage transaction is completed; sending, from the UFS controller to a UFS storage device, the command; and receiving, at the UFS controller from the UFS storage device, a response indicating that the command has been executed and that the storage transaction has been completed.

In some implementations, a non-transitory computer-readable medium storing a set of instructions for wireless communication includes one or more instructions that, when executed by one or more processors of a UFS controller, cause the UFS controller to: receive, from a UFS driver, a command associated with a storage transaction for an application that runs on a processor; identify, from the command, a data transfer size associated with the command; identify, from a register, a PM-QoS control data transfer size; send, to the processor, a PM-QoS processor vote based at least in part on the data transfer size associated with the command in relation to the PM-QoS control data transfer size, wherein the PM-QoS processor vote prevents the processor from entering a low power state until the storage transaction is completed; send, to a UFS storage device, the command; and receive, from the UFS storage device, a response indicating that the command has been executed and that the storage transaction has been completed.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a flowchart of an example process associated with a UFS controller based PM-QoS processor voting, in accordance with the present disclosure.

DETAILED DESCRIPTION

Figure 1:
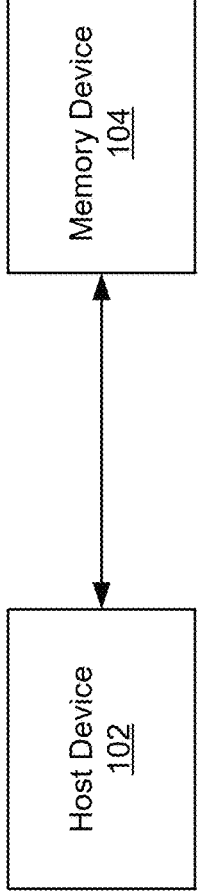
FIG. 1 is a diagram illustrating an example associated with universal flash storage (UFS), in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Universal flash storage (UFS) is a specification for non-volatile memory. UFS was developed by the Joint Electron Device Engineering Council (JEDEC) solid state technology association. UFS may be utilized in a variety of electronic devices, such as smart phones, tablets, and digital cameras. UFS may offer a high-performance and efficient storage solution. UFS may provide high-speed data transfer capabilities, which may be useful for high-resolution video recording, fast application loading, and/or quick data transfers. UFS may support simultaneous read and write operations, known as full duplex, which may enhance a multitasking performance. UFS may be power-efficient, which is crucial for mobile devices. UFS may utilize a command queue, which may allow for multiple commands to be processed in parallel, which may improve overall efficiency and performance. The command queue may reduce power usage during data processing.

A UFS controller may support a power management quality of service (PM-QoS) framework. The PM-QoS framework may allow for a fine tuning of a central processing unit (CPU) idle system governance. The PM-QoS framework may implement CPU idle power saving techniques for real-time workloads. The PM-QoS framework may serve a crucial role in balancing power efficiency and performance in a UFS storage system. The PM-QoS framework may allow drivers, subsystems, and/or user space applications to register performance expectations related to CPU latency. The PM-QoS framework may manage latency requirements for specific devices. When the PM-QoS framework is used to register a driver with a specific latency, the PM-QoS framework may ensure that the specific latency is satisfied (e.g., a PM-QoS for a CPU may ensure that an exit latency is within a driver requested latency).

A UFS based target, such as a mobile device, may support multiple operating systems with UFS as a storage device. The multiple operating systems may include an open-source operating system (e.g., Linux), a Unix-like real-time operating system (e.g., QNX), a real-time operating system (e.g., Green Hills), a graphical operating system (e.g., Windows), or any other type of high level operating system (HLOS). The UFS based target may store multiple images that can be selected from during a bootup of the UFS based target, where the multiple images may correspond to the multiple operating systems. However, a PM-QoS CPU voting/unvoting mechanism for preventing CPUs from entering a low power state for a certain period of time may be a software implementation (driver implementation) that is limited to one operating system, such as the open-source operating system. Each type of operating system may not be configured to implement the PM-QoS CPU voting/unvoting mechanism, and configuring each type of operating system to be able to support the PM-QOS CPU voting/unvoting mechanism may be unduly complicated.

Various aspects relate generally to UFS devices. Some aspects more specifically relate to UFS controller based PM-QoS CPU voting. In some examples, a UFS controller may receive, from a UFS driver, a command associated with a storage transaction for an application that runs on a CPU. The storage transaction may be associated with a read-write request. The storage transaction may be associated with a data transfer. The UFS controller may identify, from the command, a data transfer size associated with the command. The UFS controller may identify, from a register, a PM-QoS control data transfer size. The UFS controller may send, to the CPU, a PM-QoS CPU vote based at least in part on the data transfer size associated with the command in relation to the PM-QoS control data transfer size. The UFS controller may compare the data transfer size, associated with the command, and the PM-QoS control data transfer size, as identified from the register. The UFS controller may send the PM-QOS CPU vote based at least in part on the data transfer size being less than the PM-QoS control data transfer size. The PM-QoS CPU vote may prevent the CPU from entering a low power state until the storage transaction is completed. The UFS controller may send, to a UFS storage device, the command. The UFS controller may receive, from the UFS storage device, a response indicating that the command has been executed and that the storage transaction has been completed.

In some aspects, the UFS controller may send, to the CPU, a PM-QOS CPU unvote based at least in part on the response. The PM-QOS CPU unvote may enable the CPU to enter the low power state after the storage transaction is completed. The PM-QOS CPU unvote may include setting a PM-QoS configuration bit in the register to indicate that a UFS controller based PM-QoS voting or unvoting feature is disabled. The UFS controller may send the PM-QoS CPU vote in accordance with a UFS controller based PM-QoS voting or unvoting feature, where the UFS controller based PM-QoS voting or unvoting feature may be a hardware based feature. The UFS controller may send the PM-QoS CPU vote in accordance with a UFS controller based PM-QoS voting or unvoting feature that is agnostic of an operating system associated with the UFS driver.

In some aspects, the register may be a UFS vendor control PM-QoS register. The register may be associated with a UFS controller vendor register space. The register may indicate a PM-QoS configuration bit that is set to indicate whether a UFS controller based PM-QoS voting or unvoting feature is enabled or disabled. The register may indicate the PM-QoS control data transfer size.

Particular aspects of the subject matter described in this disclosure can be implemented to realize one or more of the following potential advantages. In some examples, by enabling the UFS controller to send the PM-QOS CPU vote or the PM-QOS CPU unvote to the CPU, the described techniques can be used to prevent the CPU from entering the low power state when the storage transaction is being completed. When the CPU does not enter the low power state, the CPU does not have to wake up from the low power state in order to perform subsequent data processing for the storage transaction, which would otherwise increase a latency for the data processing. The CPU may be able to enter the low power state only after the data processing is completed. Further, by implementing a UFS controller-based PM-QoS CPU voting/unvoting feature, as opposed to an operating system based feature, PM-QOS CPU voting/unvoting may be supported regardless of a type of operating system. An operating system associated with the UFS driver may be agnostic of PM-QOS CPU voting/unvoting, which may improve an overall system performance.

FIG. 1 is a diagram illustrating an example 100 associated with UFS, in accordance with the present disclosure.

As shown in FIG. 1, a host device 102, such as a UFS controller or a UFS host, may communicate with a memory device 104, such as a UFS storage device or a UFS memory device. The UFS controller may be a UFS hardware controller. The host device 102 may be associated with an application processor or a system on chip (SoC), for example, in a mobile device. The memory device 104 may include a controller and non-volatile memory, such as flash memory. The host device 102 may communicate with the memory device 104 via an interconnect. The interconnect may utilize a high-speed interface to allow for rapid data transfer between the host device 102 and the memory device 104.

As indicated above, FIG. 1 is provided as an example. Other examples may differ from what is described with regard to FIG. 1.

A UFS controller may support a PM-QOS framework. The PM-QoS framework may allow for a fine tuning of a CPU idle system governance. The PM-QoS framework may implement CPU idle power saving techniques for real-time workloads. The PM-QoS framework may serve a crucial role in balancing power efficiency and performance in a UFS storage system. The PM-QoS framework may allow drivers, subsystems, and/or user space applications to register performance expectations related to CPU latency. The PM-QoS framework may manage latency requirements for specific devices. When the PM-QoS framework is used to register a driver with a specific latency, the PM-QOS framework may ensure that the specific latency is satisfied (e.g., a PM-QoS for a CPU may ensure that an exit latency is within a driver requested latency).

The host device may receive a command from an application via a device driver. The application may be running on a CPU. The command may be a UFS command, such as a read/write command. The read/write command may be associated with a relatively small storage transaction, such as a 4K data size transaction. The storage transaction may be associated with a phone directory browsing, a message, or a chat application. The device driver may be a software entity. The host device may then submit the command to a memory device, such as a UFS storage device. However, in some cases, before the memory device is able to respond to the host device, the CPU that is to consume the storage transaction may enter a low power state. After the command is completed by the host device and/or the memory device, an interrupt request (IRQ) may be generated to notify the CPU regarding a completion of the command. The IRQ may indicate to the CPU that a command processing by the CPU is needed. The command processing may be related to the storage transaction. When the CPU is in the low power state (or sleep state), the CPU is to wake up from the low power state before the CPU is able to handle the IRQ (e.g., a current interrupt). Waking up the CPU from the low power state may involve an additional latency for the command processing, and such a latency may negatively affect UFS random performance metrics (e.g., a degradation of about 13-15% in a system on chip (SoC)). The UFS random performance metrics may be crucial for UFS based targets (e.g., mobile devices) because a daily usage of such UFS based targets often involves a relatively large number of storage transactions. An amount of time needed for waking up the CPU may be greater than an amount of time needed for the command processing. Thus, the CPU should not enter the low power state for such relatively small storage transactions.

Figure 2:
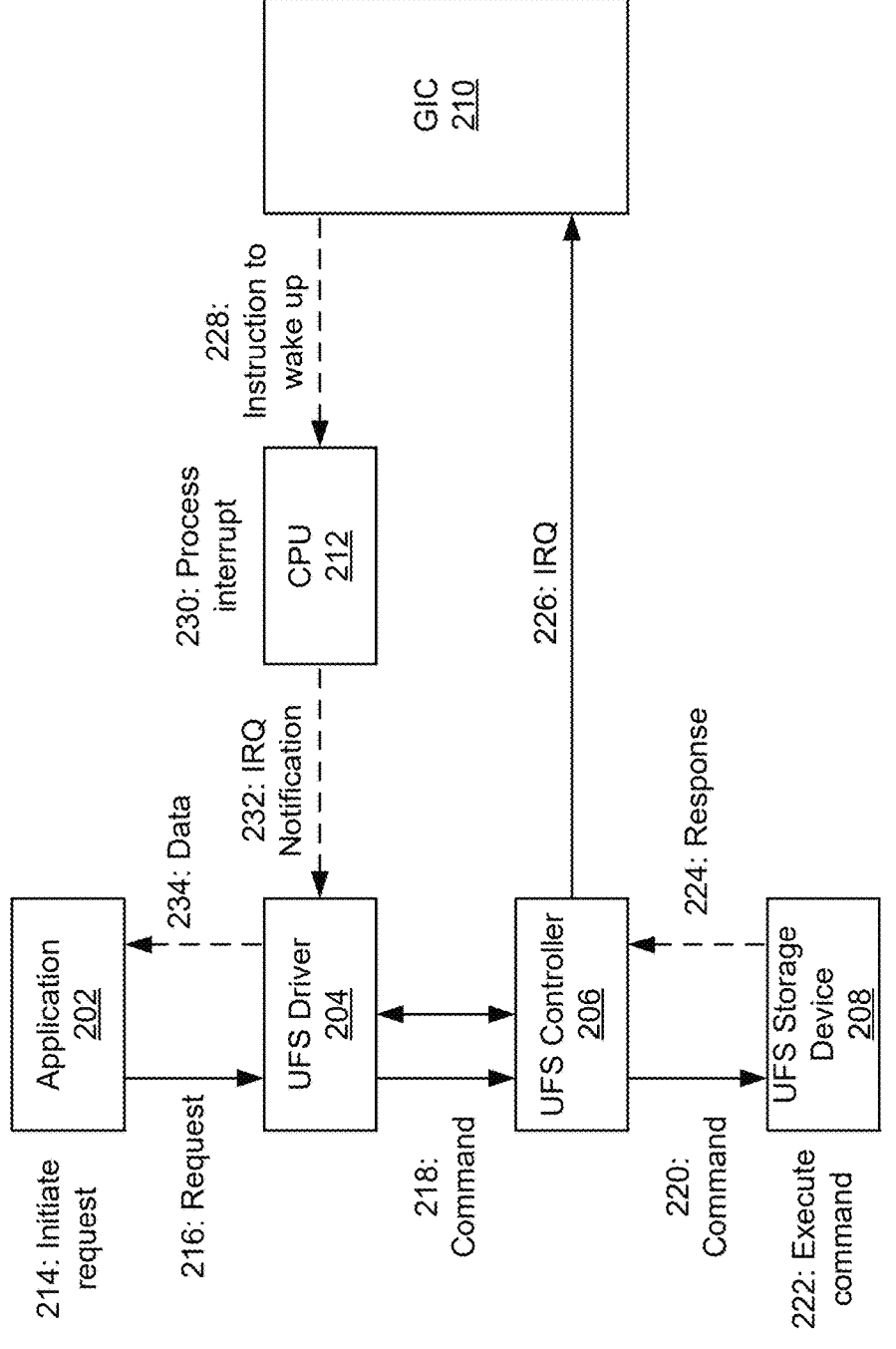
FIG. 2 is a diagram illustrating an example of fulfilling a command in a UFS system associated with a peripheral device, in accordance with the present disclosure.

FIG. 2 is a diagram illustrating an example 200 of fulfilling a command in a UFS system associated with a peripheral device, in accordance with the present disclosure. As shown in FIG. 2, the example 200 includes an application 202, a UFS driver 204, a UFS controller 206, a UFS storage device 208, a generic interrupt controller (GIC) 210, and a CPU 212. The UFS controller 206 may be associated with an SoC. The UFS driver 204 may be a software entity associated with an operating system that is running on the SoC.

As shown by reference number 214, the application 202, which may be running on the CPU 212, may initiate a read/write data request. The read/write data request may be a UFS read/write data request. The read/write data request may be associated with a relatively small storage transaction, such as a 4K data size transaction. The storage transaction may be associated with a phone directory browsing, a message, or a chat application. As shown by reference number 216, the application 202 may send the read/write data request to the UFS driver 204. As shown by reference number 218, the UFS driver 204 may generate a command based at least in part on the read/write data request (e.g., the UFS driver 204 may frame a UFS command packet based at least in part on the read/write request), and then the UFS driver 204 may send the command to the UFS controller 206. As shown by reference number 220, the UFS controller 206 may send the command to the UFS storage device 208. As shown by reference number 222, the UFS storage device 208 may execute (or complete) the command.

As shown by reference number 224, the UFS storage device 208 may send a response to the UFS controller 206. The UFS controller 206 may update an interrupt status register to indicate that the command has been completed. As shown by reference number 226, the UFS controller 206 may send an IRQ to the GIC 210. The UFS controller 206 may send the IRQ to indicate that data from the completed command is to be processed by the CPU 212. In some cases, when the command is being sent from the UFS controller 206 to the UFS storage device 208, the command is being executed by the UFS storage device 208, and/or the IRQ is being sent to the GIC 210, the CPU 212 may enter a low power state. In this case, the CPU 212 may go offline.

As shown by reference number 228, the GIC 210 may instruct the CPU 212 to wake up from the low power state, which may involve an additional latency. The additional latency may result from an amount of time needed for the CPU 212 to exit the low power state and become fully operational. The GIC 210 may instruct the CPU 212 to wake up from the low power state in order to process an interrupt. For example, the interrupt may be associated with the processing of the data from the UFS storage device 208. Waking up the CPU 212 from the low power state for processing of the interrupt may impact a UFS random read/write performance score. As shown by reference number 230, the CPU 212 may process the interrupt. As shown by reference number 232, the IRQ may be notified to the UFS driver 204. As shown by reference number 234, the data may be transferred to the application 202, which may be in response to the read/write data request initiated by the application 202.

As indicated above, FIG. 2 is provided as an example. Other examples may differ from what is described with regard to FIG. 2.

Figure 3:
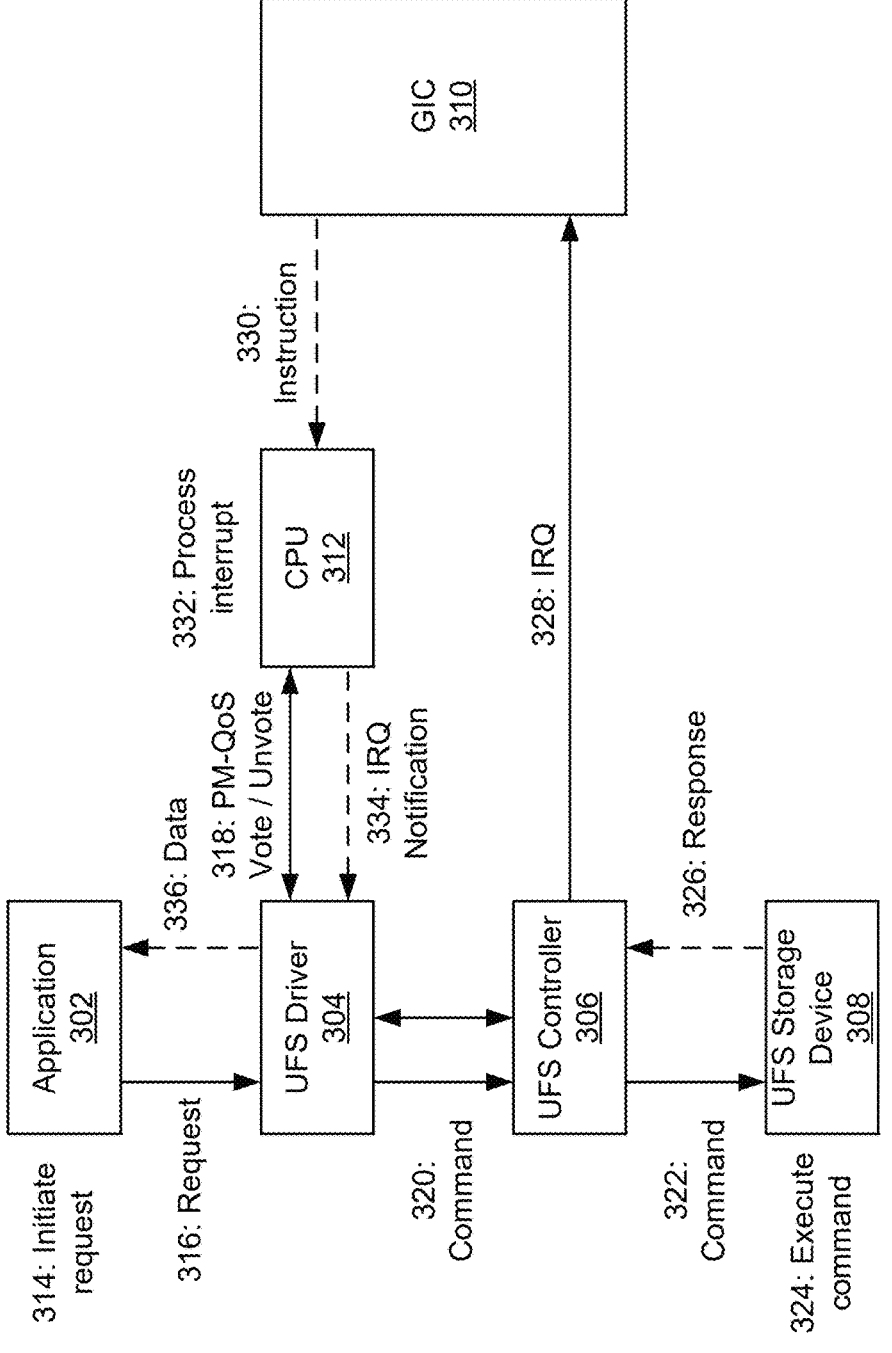
FIG. 3 is a diagram illustrating an example of fulfilling a command in a UFS system associated with a peripheral device, in accordance with the present disclosure.

FIG. 3 is a diagram illustrating an example 300 of fulfilling a command in a UFS system associated with a peripheral device, in accordance with the present disclosure. As shown in FIG. 3, the example 300 includes an application 302, a UFS driver 304, a UFS controller 306, a UFS storage device 308, a generic interrupt controller (GIC) 310, and a CPU 312. The UFS controller 306 may be associated with an SoC. The UFS driver 304 may be a software entity associated with an operating system that is running on the SoC.

As shown by reference number 314, the application 302, which may be running on the CPU 312, may initiate a read/write data request. The read/write data request may be a UFS read/write data request. The read/write data request may be associated with a relatively small storage transaction, such as a 4K data size transaction. The storage transaction may be associated with a phone directory browsing, a message, or a chat application. As shown by reference number 316, the application 302 may send the read/write data request to the UFS driver 304. As shown by reference number 318, the UFS driver 304 may indicate a PM-QoS vote to the CPU 212, which may guarantee that the CPU 212 will not enter a low power state, which may allow the storage transaction to be processed by the CPU 212 without any delay. As shown by reference number 320, the UFS driver 304 may generate a command based at least in part on the read/write data request (e.g., the UFS driver 304 may frame a UFS command packet based at least in part on the read/write request), and then the UFS driver 304 may send the command to the UFS controller 306.

As shown by reference number 322, the UFS controller 306 may send the command to the UFS storage device 308. As shown by reference number 324, the UFS storage device 308 may execute (or complete) the command. As shown by reference number 326, the UFS storage device 308 may send a response to the UFS controller 306. The UFS controller 306 may update an interrupt status register to indicate that the command has been completed. As shown by reference number 328, the UFS controller 306 may send an IRQ to the GIC 310. The UFS controller 306 may send the IRQ to indicate that data from the completed command is to be processed by the CPU 312. As shown by reference number 330, the GIC 310 may instruct the CPU 312 to process an interrupt. For example, the interrupt may be associated with the processing of the data from the UFS storage device 308. As shown by reference number 332, the CPU 312 may process the interrupt. As shown by reference number 334, the IRQ may be notified to the UFS driver 304. As shown by reference number 336, the data may be transferred to the application 302, which may be in response to the read/write data request initiated by the application 302. In addition, the data transfer may trigger a PM-QoS unvote to the CPU 312, which may cause the CPU 312 from no longer being prevented from entering the low power state.

In this example, the peripheral device may be dependent on a CPU device driver to handle a CPU state associated with the CPU 312. A kernel (e.g., a Linux kernel) may provide a software mechanism to allow devices to vote and unvote by specifying a system wide latency tolerance or by specifying a per-core latency tolerance. A CPU idle governor, such as the GIC 310, may compare the system wide latency tolerance or the per-core latency tolerance with an exit latency of each CPU, and the CPU idle governor may select the CPU 312 that meets a latency requirement. Before sending the command to the UFS controller 306, the UFS driver 304 may configure a PM-QoS CPU vote corresponding to the CPU 312, which may guarantee that the CPU 312 remains in an active state and will not enter the low power state, which may allow small transactions to be honored without any delay. The PM-QoS CPU vote may be removed (PM-QoS CPU unvoting) after the small transactions are completed. By implementing PM-QOS CPU voting/unvoting for the small transactions, which may prevent CPUs from entering the low power state for a certain period of time, UFS random performance metrics may be improved.

As indicated above, FIG. 3 is provided as an example. Other examples may differ from what is described with regard to FIG. 3.

In one example, a UFS based target, such as a mobile device, may support multiple operating systems with UFS as a storage device. The multiple operating systems may include an open-source operating system (e.g., Linux), a Unix-like real-time operating system (e.g., QNX), a real-time operating system (e.g., Green Hills), a graphical operating system (e.g., Windows), or any other type of HLOS. The UFS based target may store multiple images that can be selected from during a bootup of the UFS based target, where the multiple images may correspond to the multiple operating systems. However, a PM-QoS CPU voting/unvoting mechanism for preventing CPUs from entering a low power state for a certain period of time may be a software implementation (driver implementation) that is limited to one operating system, such as the open-source operating system. Each type of operating system may not be configured to implement the PM-QOS CPU voting/unvoting mechanism, and configuring each type of operating system to be able to support the PM-QOS CPU voting/unvoting mechanism may be unduly complicated.

In some implementations, an autonomous PM-QOS CPU voting/unvoting feature may be supported for a UFS performance enhancement. In a UFS controller (e.g., UFS hardware controller) vendor register space, a UFS controller-based PM-QoS CPU voting/unvoting feature may be enabled or disabled. When the UFS controller-based PM-QoS CPU voting/unvoting feature is enabled, a UFS controller may parse a command received from a UFS driver. The command may be a UFS protocol information units (UPIU) command. The command may be associated with a storage transaction. The command may be associated with a read/write request from the UFS driver. The UFS controller may extract a data transfer size from the command. Depending on the transfer data size, the UFS controller may configure a PM-QoS CPU vote to ensure that a CPU does not enter a low power state while the data transaction is being completed. After the data transaction is completed, the UFS controller may configure a PM-QOS CPU unvote, which may allow the CPU to enter the low power state if needed. The UFS controller, when putting the PM-QOS CPU unvote, may set a PM-QoS configuration bit to disable. As a result, the CPU may not enter the low power state when the storage transaction is being completed and then have to wake up for a subsequent data processing for the storage transaction, which may otherwise increase a latency for the data processing. Further, by implementing the UFS controller-based PM-QoS CPU voting/unvoting feature, as opposed to an operating system based feature, PM-QOS CPU voting/unvoting may be supported regardless of a type of operating system. An operating system may be agnostic of PM-QoS CPU voting/unvoting, which may improve an overall system performance.

Figure 4:
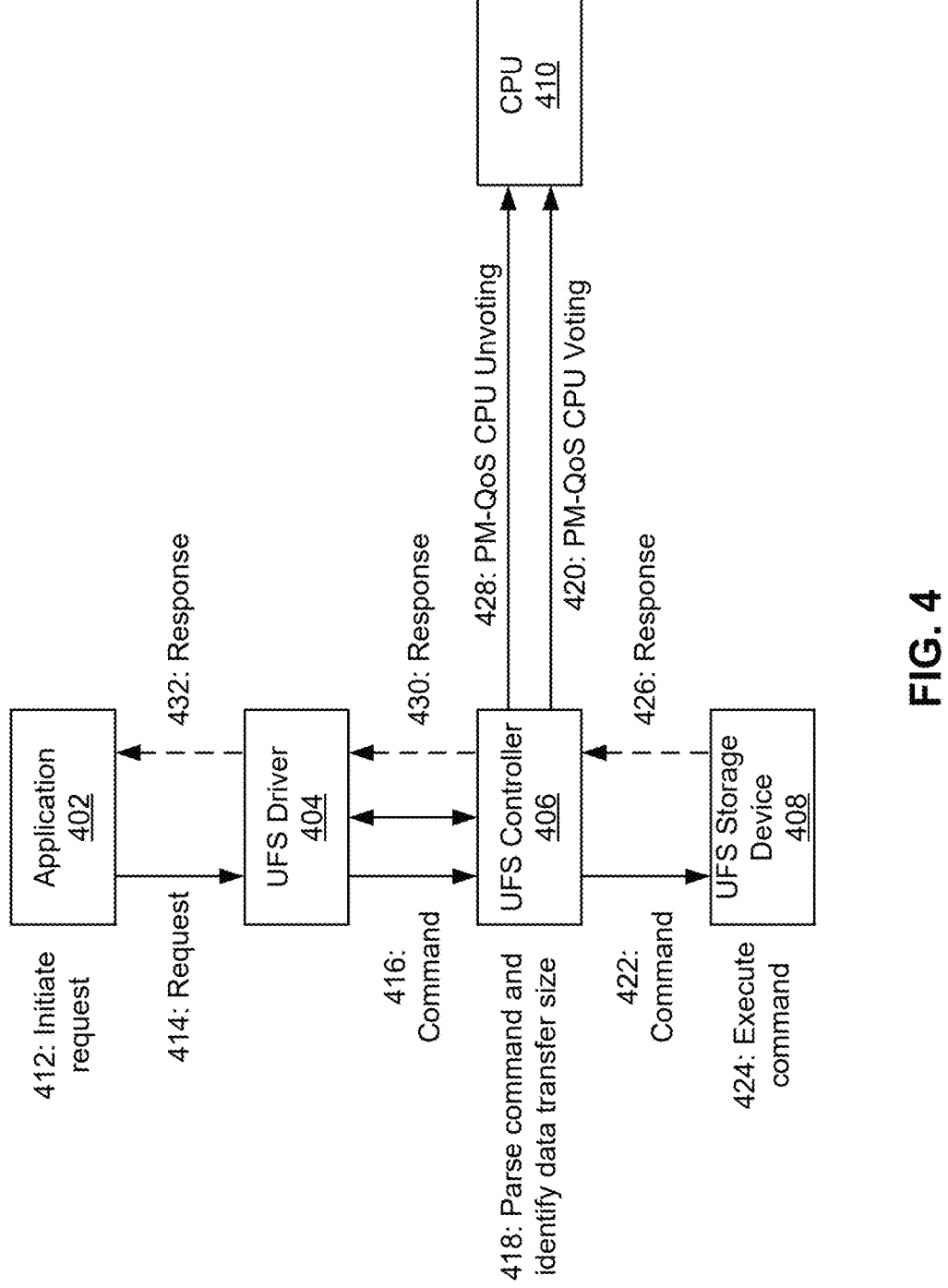
FIG. 4 is a diagram illustrating an example associated with a UFS controller based power management quality of service (PM-QoS) processor voting, in accordance with the present disclosure.

FIG. 4 is a diagram illustrating an example 400 associated with a UFS controller based PM-QoS processor voting, in accordance with the present disclosure. As shown in FIG. 4, the example 400 includes an application 402, a UFS driver 404, a UFS controller 406, a UFS storage device 408, and a CPU 410. The UFS controller 406 may be associated with an SoC. The UFS driver 404 may be a software entity associated with an operating system that is running on the SoC.

As shown by reference number 412, the application 402, which may be running on the CPU 410, may initiate a read/write data request. The read/write data request may be a UFS read/write data request. The read/write data request may be associated with a data transfer. The read/write data request may be associated with a relatively small storage transaction, such as a 4K data size transaction. The storage transaction may be associated with a phone directory browsing, a message, or a chat application. As shown by reference number 414, the application 402 may send the read/write data request to the UFS driver 404.

As shown by reference number 416, the UFS driver 404 may generate a command based at least in part on the read/write data request (e.g., the UFS driver 404 may frame a UFS command packet based at least in part on the read/write request), and then the UFS driver 404 may send the command to the UFS controller 406. The UFS driver 404 may also configure a register, such as a UFS vendor control PM-QoS (UFS_VENDOR_CTRL_PMQOS) register. The UFS vendor control PM-QOS register may indicate a data transfer size value (PM-QoS control data transfer size). As shown by reference number 418, the UFS controller 406 may fetch the command, and the UFS controller 406 may parse the command to fetch a data transfer size associated with the command. The data transfer size may be associated with the storage transaction, where the storage transaction may be associated with the command. The command may be a UPIU command. The UFS controller 406 may compare the data transfer size associated with the command with the data transfer size value stored in the UFS vendor control PM-QOS register. As shown by reference number 420, the UFS controller 406 may indicate a PM-QoS CPU vote to the CPU 410, which may guarantee that the CPU 410 will not enter a low power state, which may allow the storage transaction to be processed by the CPU 410 without any delay. The CPU 410, after receiving the PM-QOS CPU vote, may not enter the low power state. The UFS controller 406 may support a UFS controller-based PM-QoS CPU voting/unvoting feature, which may allow the CPU 410 from being prevented from entering the low power state for a certain duration of time.

As shown by reference number 422, the UFS controller 406 may send the command to the UFS storage device 408. As shown by reference number 424, the UFS storage device 408 may execute (or complete) the command. The UFS storage device 408 may complete the data transfer based at least in part on an execution of the command. As shown by reference number 426, the UFS storage device 408 may send a response to the UFS controller 406. As shown by reference number 428, the UFS controller 406 may indicate a PM-QoS CPU unvote to the CPU 410, which may allow the CPU 410 to enter into the low power state if needed. The UFS controller 406 may indicate the PM-QoS CPU unvote to the CPU 410 after the response is received from the UFS storage device 408. The CPU 410, after receiving the PM-QOS CPU unvote, may be able to enter the low power state. As shown by reference number 430, the UFS controller 406 may send the response to the UFS driver 404. As shown by reference number 432, the UFS driver 404 may send the response to the application 402. The data may be transferred to the application 402, which may be in response to the read/write data request initiated by the application 402.

In some aspects, the UFS controller 406 (e.g., a UFS host controller) may implement an autonomous PM-QoS CPU voting/unvoting based at least in part on a data size (e.g., 4K) in the command. In a UFS controller (e.g., UFS hardware controller) vendor register space, a UFS controller-based PM-QoS CPU voting/unvoting configuration may be enabled or disabled. The UFS controller vendor register space may include the UFS vendor control PM-QoS register. The UFS vendor control PM-QOS register may be set to enable or disable the PM-QoS CPU voting/unvoting configuration. The UFS vendor control PM-QOS register may include a PM-QoS configuration bit, which may be set accordingly. For example, the UFS vendor control PM-QoS register may be set to "1" to indicate that the PM-QOS CPU voting/unvoting configuration is enabled, or the UFS vendor control PM-QOS register may be set to "0" to indicate that the PM-QoS CPU voting/unvoting configuration is disabled. The PM-QOS CPU voting/unvoting configuration may be associated with a first offset (e.g., Offset 0 h). The UFS vendor control PM-QoS register may also indicate the PM-QoS control data transfer size, which may be a data size in multiples of 4K. The PM-QoS control data transfer size may be associated with a second offset (e.g., Offset (15 h:1 h)).

In some aspects, after the command is submitted to the UFS controller 406 (e.g., via a doorbell register or a submission queue (SQ) tail pointer), the UFS controller 406 may parse the command and extract the data transfer size from the command. Depending on the data transfer size, the UFS controller 406 may configure a PM-QoS CPU vote to ensure that the CPU 410 does not enter the low power state while the storage transaction is still being completed by the UFS storage device 408 and/or processed by the CPU 410. For example, when the data transfer size associated with the command exceeds the PM-QoS control data transfer size, as indicated in the UFS vendor control PM-QoS register, the UFS controller 406 may configure the PM-QoS CPU vote. When the data transfer size associated with the command does not exceed the PM-QoS control data transfer size, the UFS controller 406 may not configure the PM-QOS CPU vote. After the storage transaction is completed by the UFS storage device 408 and/or processed by the CPU 410, the UFS controller 406 may set the UFS vendor control PM-QOS register to disable the PM-QoS CPU voting/unvoting configuration (e.g., the UFS controller 406 may set the UFS vendor control PM-QoS register to "0" in order to disable the PM-QoS CPU voting/unvoting configuration). After the read/write request (or a plurality of read/write requests) from the application 402 have been completed, the UFS controller 406 may configure a PM-QOS CPU unvote so that the CPU 410 is able to enter the low power state. The CPU 410 may be able to enter the low power state based at least in part on an idle timer or by using a UFS vendor register.

In some aspects, the UFS controller-based PM-QOS CPU voting/unvoting feature may allow for adding CPU latency PM-QoS support in the UFS controller 406, which may improve a random performance for UFS. The UFS controller-based PM-QOS CPU voting/unvoting feature may be a hardware-based feature that is applicable to multiple images and multiple operating systems associated with the multiple images, respectively, where UFS storage use cases may be executed on any of the multiple operating systems. The UFS controller-based PM-QoS CPU voting/unvoting feature may be supported in a UFS JEDEC specification. The UFS controller-based PM-QOS CPU voting/unvoting feature may introduce a new UFS hardware controller register, which may be used by the UFS controller 406 to identify a packet size for which the PM-QOS CPU vote is to be made. For storage transactions that satisfy the PM-QoS control data transfer size, the UFS controller 406 may ensure to vote on the CPU 410 not entering into the low power state until the storage transactions are completed. The UFS controller-based PM-QOS CPU voting/unvoting feature may be applicable for boot loaders and may result in a faster bootup time. The UFS controller-based PM-QOS CPU voting/unvoting feature may be impactful on devices for which a boot key performance indicator (KPI) is crucial. Further, a PM-QoS CPU voting/unvoting implementation in software may involve significant software latencies due to a software environment involving multiple threads, synchronization, and/or an operating system, and such software latencies may be avoided by implementing the PM-QoS CPU voting/unvoting as a hardware-based implementation in the UFS controller 406.

As indicated above, FIG. 4 is provided as an example. Other examples may differ from what is described with regard to FIG. 4.

Figure 5:
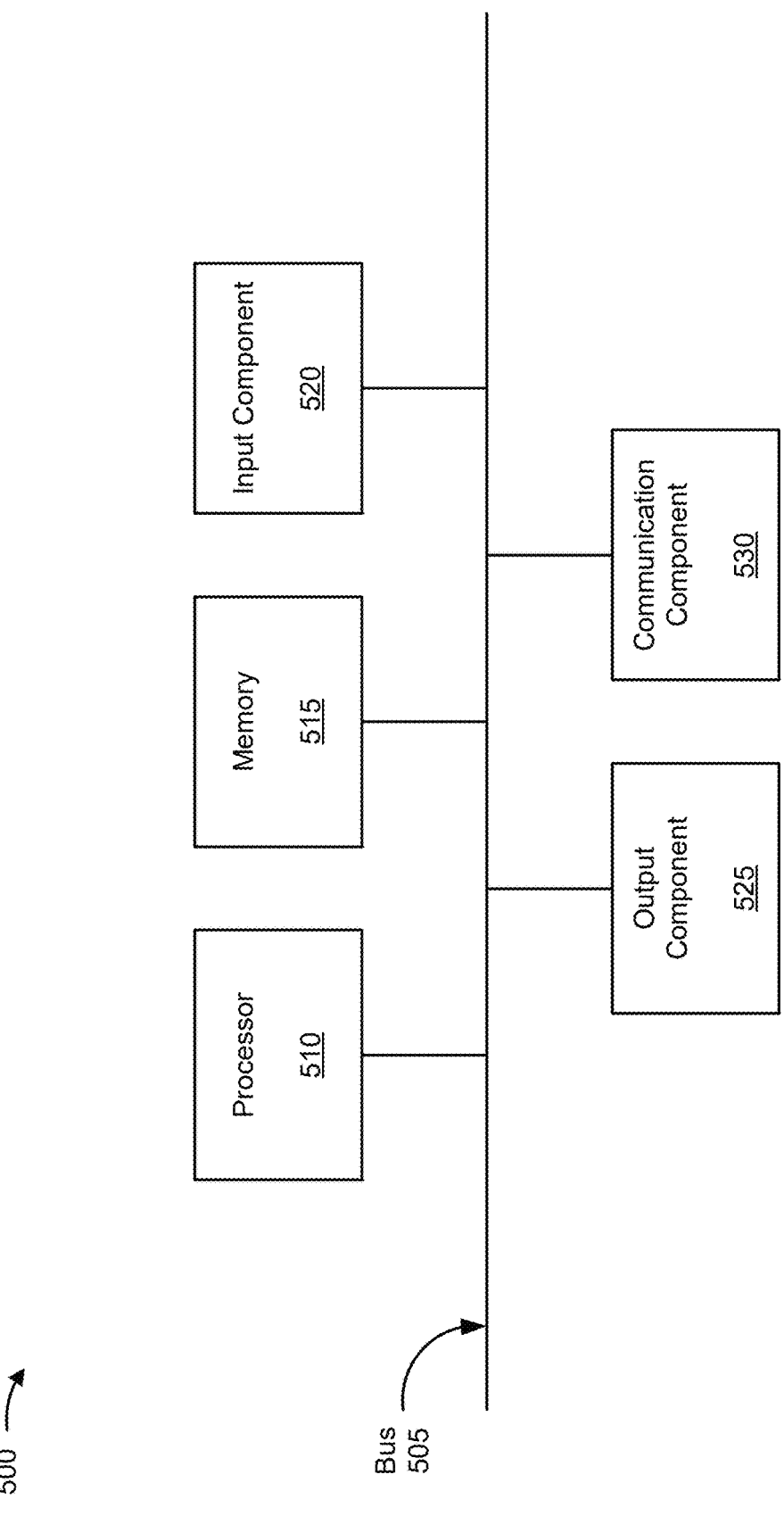
FIG. 5 is a diagram illustrating example components of a device, in accordance with the present disclosure.

FIG. 5 is a diagram illustrating example components of a device 500, in accordance with the present disclosure. The device 500 may be associated with a UFS controller (e.g., UFS controller 406). As shown in FIG. 5, the device 500 may include a bus 505, a processor 510, a memory 515, an input component 520, an output component 525, and/or a communication component 530.

The bus 505 may include one or more components that enable wired and/or wireless communication among the components of the device 500. The bus 505 may couple together two or more components of FIG. 5, such as via operative coupling, communicative coupling, electronic coupling, and/or electric coupling. For example, the bus 505 may include an electrical connection (e.g., a wire, a trace, and/or a lead) and/or a wireless bus. The processor 510 may include a central processing unit, a graphics processing unit, a microprocessor, a controller, a microcontroller, a digital signal processor, a field-programmable gate array, an application-specific integrated circuit, and/or another type of processing component. The processor 510 may be implemented in hardware, firmware, or a combination of hardware and software. In some aspects, the processor 510 may include one or more processors capable of being programmed to perform one or more operations or processes described elsewhere herein.

The memory 515 may include volatile and/or nonvolatile memory. For example, the memory 515 may include random access memory (RAM), read only memory (ROM), a hard disk drive, and/or another type of memory (e.g., a flash memory, a magnetic memory, and/or an optical memory). The memory 515 may include internal memory (e.g., RAM, ROM, or a hard disk drive) and/or removable memory (e.g., removable via a universal serial bus connection). The memory 515 may be a non-transitory computer-readable medium. The memory 515 may store information, one or more instructions, and/or software (e.g., one or more software applications) related to the operation of the device 500. In some aspects, the memory 515 may include one or more memories that are coupled (e.g., communicatively coupled) to one or more processors (e.g., processor 510), such as via the bus 505. Communicative coupling between a processor 510 and a memory 515 may enable the processor 510 to read and/or process information stored in the memory 515 and/or to store information in the memory 515.

The input component 520 may enable the device 500 to receive input, such as user input and/or sensed input. For example, the input component 520 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 525 may enable the device 500 to provide output, such as via a display, a speaker, and/or a light-emitting diode. The communication component 530 may enable the device 500 to communicate with other devices via a wired connection and/or a wireless connection. For example, the communication component 530 may include a receiver, a transmitter, a transceiver, a modem, a network interface card, and/or an antenna.

The device 500 may perform one or more operations or processes described herein. For example, a non-transitory computer-readable medium (e.g., memory 515) may store a set of instructions (e.g., one or more instructions or code) for execution by the processor 510. The processor 510 may execute the set of instructions to perform one or more operations or processes described herein. In some aspects, execution of the set of instructions, by one or more processors 510, causes the one or more processors 510 and/or the device 500 to perform one or more operations or processes described herein. In some aspects, hardwired circuitry may be used instead of or in combination with the instructions to perform one or more operations or processes described herein. Additionally, or alternatively, the processor 510 may be configured to perform one or more operations or processes described herein. Thus, aspects described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

FIG. 6 is a flowchart of an example process 600 associated with a UFS controller based PM-QoS processor voting, in accordance with the present disclosure. In some implementations, one or more process blocks of FIG. 6 are performed by a UFS controller (e.g., UFS controller 406). Additionally, or alternatively, one or more process blocks of FIG. 6 may be performed by one or more components of device 500, such as processor 510, memory 515, input component 520, output component 525, and/or communication component 530.

As shown in FIG. 6, process 600 may include receiving, at the UFS controller from a UFS driver, a command associated with a storage transaction for an application that runs on a processor (block 610). For example, the host device may receive, from a UFS driver, a command associated with a storage transaction for an application that runs on a processor, as described above.

As further shown in FIG. 6, process 600 may include identifying, at the UFS controller from the command, a data transfer size associated with the command (block 620). For example, the host device may identify, from the command, a data transfer size associated with the command, as described above.

As further shown in FIG. 6, process 600 may include identifying, at the UFS controller from a register, a PM-QoS control data transfer size (block 630). For example, the host device may identify, from a register, a PM-QoS control data transfer size, as described above.

As shown in FIG. 6, process 600 may include sending, from the UFS controller to the processor, a PM-QoS processor vote based at least in part on the data transfer size associated with the command in relation to the PM-QoS control data transfer size, wherein the PM-QoS processor vote prevents the processor from entering a low power state until the storage transaction is completed (block 640). For example, the host device may send, to the processor, a PM-QoS processor vote based at least in part on the data transfer size associated with the command in relation to the PM-QoS control data transfer size, wherein the PM-QoS processor vote prevents the processor from entering a low power state until the storage transaction is completed, as described above.

As further shown in FIG. 6, process 600 may include sending, from the UFS controller to a UFS storage device, the command (block 650). For example, the host device may send, to a UFS storage device, the command, as described above.

As further shown in FIG. 6, process 600 may include receiving, at the UFS controller from the UFS storage device, a response indicating that the command has been executed and that the storage transaction has been completed (block 660). For example, the host device may receive, from the UFS storage device, a response indicating that the command has been executed and that the storage transaction has been completed, as described above.

Process 600 may include additional implementations, such as any single implementation or any combination of implementations described below and/or in connection with one or more other processes described elsewhere herein.

In a first implementation, process 600 includes sending, from the UFS controller to the processor, a PM-QoS processor unvote based at least in part on the response, wherein the PM-QoS processor unvote enables the processor to enter the low power state after the storage transaction is completed, and the PM-QoS processor unvote includes setting a PM-QoS configuration bit in the register to indicate that a UFS controller based PM-QoS voting or unvoting feature is disabled.

In a second implementation, alone or in combination with the first implementation, process 600 includes comparing, at the UFS controller, the data transfer size, associated with the command, and the PM-QoS control data transfer size, as identified from the register, wherein the PM-QoS processor vote is sent based at least in part on the data transfer size being less than the PM-QoS control data transfer size.

In a third implementation, alone or in combination with one or more of the first and second implementations, process 600 includes sending the PM-QoS processor vote in accordance with a UFS controller based PM-QoS voting or unvoting feature, and the UFS controller based PM-QoS voting or unvoting feature is a hardware based feature.

In a fourth implementation, alone or in combination with one or more of the first through third implementations, the register is a UFS vendor control PM-QoS register, and the register is associated with a UFS controller vendor register space.

In a fifth implementation, alone or in combination with one or more of the first through fourth implementations, the register indicates a PM-QoS configuration bit that is set to indicate whether a UFS controller based PM-QoS voting or unvoting feature is enabled or disabled.

In a sixth implementation, alone or in combination with one or more of the first through fifth implementations, the register indicates the PM-QoS control data transfer size.

In a seventh implementation, alone or in combination with one or more of the first through sixth implementations, process 600 includes sending the PM-QoS processor vote in accordance with a UFS controller based PM-QoS voting or unvoting feature that is agnostic of an operating system associated with the UFS driver.

In an eighth implementation, alone or in combination with one or more of the first through seventh implementations, the storage transaction is associated with a read-write request.

In a nineth implementation, alone or in combination with one or more of the first through eighth implementations, the storage transaction is associated with a data transfer.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A universal flash storage (UFS) controller, comprising: one or more components configured to: receive, from a UFS driver, a command associated with a storage transaction for an application that runs on a processor; identify, from the command, a data transfer size associated with the command; identify, from a register, a power management quality of service (PM-QoS) control data transfer size; send, to the processor, a PM-QoS processor vote based at least in part on the data transfer size associated with the command in relation to the PM-QoS control data transfer size, wherein the PM-QoS processor vote prevents the processor from entering a low power state until the storage transaction is completed; send, to a UFS storage device, the command; and receive, from the UFS storage device, a response indicating that the command has been executed and that the storage transaction has been completed.

Aspect 2: The UFS controller of Aspect 1, wherein the one or more components are configured to: send, to the processor, a PM-QoS processor unvote based at least in part on the response, wherein the PM-QoS processor unvote enables the processor to enter the low power state after the storage transaction is completed, and wherein the PM-QoS processor unvote includes setting a PM-QoS configuration bit in the register to indicate that a UFS controller based PM-QoS voting or unvoting feature is disabled.

Aspect 3: The UFS controller of any of Aspects 1-2, wherein the one or more components are configured to: compare the data transfer size, associated with the command, and the PM-QoS control data transfer size, as identified from the register, wherein the PM-QoS processor vote is sent based at least in part on the data transfer size being less than the PM-QoS control data transfer size.

Aspect 4: The UFS controller of any of Aspects 1-3, wherein the one or more components are configured to: send the PM-QoS processor vote in accordance with a UFS controller based PM-QoS voting or unvoting feature, and wherein the UFS controller based PM-QoS voting or unvoting feature is a hardware based feature.

Aspect 5: The UFS controller of any of Aspects 1-4, wherein the register is a UFS vendor control PM-QoS register, and wherein the register is associated with a UFS controller vendor register space.

Aspect 6: The UFS controller of any of Aspects 1-5, wherein the register indicates a PM-QoS configuration bit that is set to indicate whether a UFS controller based PM-QoS voting or unvoting feature is enabled or disabled.

Aspect 7: The UFS controller of any of Aspects 1-6, wherein the register indicates the PM-QoS control data transfer size.

Aspect 8: The UFS controller of any of Aspects 1-7, wherein the one or more components are configured to: send the PM-QoS processor vote in accordance with a UFS controller based PM-QoS voting or unvoting feature that is agnostic of an operating system associated with the UFS driver.

Aspect 9: The UFS controller of any of Aspects 1-8, wherein the storage transaction is associated with a read-write request.

Aspect 10: The UFS controller of any of Aspects 1-9, wherein the storage transaction is associated with a data transfer.

Aspect 11: A method, comprising: receiving, at a universal flash storage (UFS) controller from a UFS driver, a command associated with a storage transaction for an application that runs on a processor; identifying, at the UFS controller from the command, a data transfer size associated with the command; identifying, at the UFS controller from a register, a power management quality of service (PM-QoS) control data transfer size; sending, from the UFS controller to the processor, a PM-QoS processor vote based at least in part on the data transfer size associated with the command in relation to the PM-QoS control data transfer size, wherein the PM-QoS processor vote prevents the processor from entering a low power state until the storage transaction is completed; sending, from the UFS controller to a UFS storage device, the command; and receiving, at the UFS controller from the UFS storage device, a response indicating that the command has been executed and that the storage transaction has been completed.

Aspect 12: The method of Aspect 11, further comprising: sending, from the UFS controller to the processor, a PM-QoS processor unvote based at least in part on the response, wherein the PM-QoS processor unvote enables the processor to enter the low power state after the storage transaction is completed, and wherein the PM-QoS processor unvote includes setting a PM-QoS configuration bit in the register to indicate that a UFS controller based PM-QoS voting or unvoting feature is disabled.

Aspect 13: The method of any of Aspects 11-12, further comprising: comparing, at the UFS controller, the data transfer size, associated with the command, and the PM-QoS control data transfer size, as identified from the register, wherein the PM-QoS processor vote is sent based at least in part on the data transfer size being less than the PM-QoS control data transfer size.

Aspect 14: The method of any of Aspects 11-13, wherein sending the PM-QoS processor vote is in accordance with a UFS controller based PM-QoS voting or unvoting feature, and wherein the UFS controller based PM-QoS voting or unvoting feature is a hardware based feature.

Aspect 15: The method of any of Aspects 11-14, wherein the register is a UFS vendor control PM-QOS register, and wherein the register is associated with a UFS controller vendor register space.

Aspect 16: The method of any of Aspects 11-15, wherein the register indicates a PM-QoS configuration bit that is set to indicate whether a UFS controller based PM-QoS voting or unvoting feature is enabled or disabled.

Aspect 17: The method of any of Aspects 11-16, wherein the register indicates the PM-QoS control data transfer size.

Aspect 18: The method of any of Aspects 11-17, wherein sending the PM-QoS processor vote is in accordance with a UFS controller based PM-QoS voting or unvoting feature that is agnostic of an operating system associated with the UFS driver.

Aspect 19: The method of any of Aspects 11-18, wherein the storage transaction is associated with a read-write request, or the storage transaction is associated with a data transfer.

Aspect 20: A non-transitory computer-readable medium storing a set of instructions for wireless communication, the set of instructions comprising: one or more instructions that, when executed by one or more processors of a universal flash storage (UFS) controller, cause the UFS controller to: receive, from a UFS driver, a command associated with a storage transaction for an application that runs on a processor; identify, from the command, a data transfer size associated with the command; identify, from a register, a power management quality of service (PM-QoS) control data transfer size; send, to the processor, a PM-QoS processor vote based at least in part on the data transfer size associated with the command in relation to the PM-QoS control data transfer size, wherein the PM-QoS processor vote prevents the processor from entering a low power state until the storage transaction is completed; send, to a UFS storage device, the command; and receive, from the UFS storage device, a response indicating that the command has been executed and that the storage transaction has been completed.

Aspect 21: A system configured to perform one or more operations recited in one or more of Aspects 1-20.

Aspect 22: An apparatus comprising means for performing one or more operations recited in one or more of Aspects 1-20.

Aspect 23: A non-transitory computer-readable medium storing a set of instructions, the set of instructions comprising one or more instructions that, when executed by a device, cause the device to perform one or more operations recited in one or more of Aspects 1-20.

Aspect 24: A computer program product comprising instructions or code for executing one or more operations recited in one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used inter-changeably with "and/or," unless explicitly stated otherwise (e.g., if used in combination with "either" or "only one of").

What is claimed is:

1. A universal flash storage (UFS) hardware controller, comprising:
   one or more components configured to:
      receive, from a UFS driver, a command associated with a storage transaction for an application that runs on a processor;
      identify, from the command, a data transfer size associated with the command;
      identify, from a register, a power management quality of service (PM-QoS) control data transfer size;
      send, to the processor, a PM-QoS processor vote based at least in part on the data transfer size associated with the command in relation to the PM-QoS control data transfer size, wherein the PM-QoS processor vote prevents the processor from entering a low power state until the storage transaction is completed;
      send, to a UFS storage device, the command; and
      receive, from the UFS storage device, a response indicating that the command has been executed and that the storage transaction has been completed.

2. The UFS hardware controller of claim 1, wherein the one or more components are configured to:
   send, to the processor, a PM-QoS processor unvote based at least in part on the response, wherein the PM-QoS processor unvote enables the processor to enter the low power state after the storage transaction is completed, and wherein the PM-QoS processor unvote includes setting a PM-QoS configuration bit in the register to indicate that a UFS controller based PM-QoS voting or unvoting feature is disabled.

3. The UFS hardware controller of claim 1, wherein the one or more components are configured to:
   compare the data transfer size, associated with the command, and the PM-QoS control data transfer size, as identified from the register, wherein the PM-QoS processor vote is sent based at least in part on the data transfer size being less than the PM-QoS control data transfer size.

4. The UFS hardware controller of claim 1, wherein the one or more components are configured to:
   send the PM-QoS processor vote in accordance with a UFS controller based PM-QoS voting or unvoting feature, and wherein the UFS controller based PM-QoS voting or unvoting feature is a hardware based feature.

5. The UFS hardware controller of claim 1, wherein the register is a UFS vendor control PM-QoS register, and wherein the register is associated with a UFS controller vendor register space.

6. The UFS hardware controller of claim 1, wherein the register indicates a PM-QoS configuration bit that is set to indicate whether a UFS controller based PM-QoS voting or unvoting feature is enabled or disabled.

7. The UFS hardware controller of claim 1, wherein the register indicates the PM-QoS control data transfer size.

8. The UFS hardware controller of claim 1, wherein the one or more components are configured to:
   send the PM-QoS processor vote in accordance with a UFS controller based PM-QoS voting or unvoting feature that is agnostic of an operating system associated with the UFS driver.

9. The UFS hardware controller of claim 1, wherein the storage transaction is associated with a read-write request.

10. The UFS hardware controller of claim 1, wherein the storage transaction is associated with a data transfer.

11. A method, comprising:

receiving, at a universal flash storage (UFS) controller from a UFS driver, a command associated with a storage transaction for an application that runs on a processor;

identifying, at the UFS controller from the command, a data transfer size associated with the command;

identifying, at the UFS controller from a register, a power management quality of service (PM-QoS) control data transfer size;

sending, from the UFS controller to the processor, a PM-QoS processor vote based at least in part on the data transfer size associated with the command in relation to the PM-QoS control data transfer size, wherein the PM-QoS processor vote prevents the processor from entering a low power state until the storage transaction is completed;

sending, from the UFS controller to a UFS storage device, the command; and receiving, at the UFS controller from the UFS storage device, a response indicating that the command has been executed and that the storage transaction has been completed.

12. The method of claim 11, further comprising:

sending, from the UFS controller to the processor, a PM-QS processor unvote based at least in part on the response, wherein the PM-QoS processor unvote enables the processor to enter the low power state after the storage transaction is completed, and wherein the PM-QoS processor unvote includes setting a PM-QoS configuration bit in the register to indicate that a UFS controller based PM-QoS voting or unvoting feature is disabled.

13. The method of claim 11, further comprising:

comparing, at the UFS controller, the data transfer size, associated with the command, and the PM-QoS control data transfer size, as identified from the register, wherein the PM-QoS processor vote is sent based at least in part on the data transfer size being less than the PM-QoS control data transfer size.

14. The method of claim 11, wherein sending the PM-QoS processor vote is in accordance with a UFS controller based PM-QoS voting or unvoting feature, and wherein the UFS controller based PM-QoS voting or unvoting feature is a hardware based feature.

15. The method of claim 11, wherein the register is a UFS vendor control PM-QoS register, and wherein the register is associated with a UFS controller vendor register space.

16. The method of claim 11, wherein the register indicates a PM-QoS configuration bit that is set to indicate whether a UFS controller based PM-QoS voting or unvoting feature is enabled or disabled.

17. The method of claim 11, wherein the register indicates the PM-QoS control data transfer size.

18. The method of claim 11, wherein sending the PM-QoS processor vote is in accordance with a UFS controller based PM-QoS voting or unvoting feature that is agnostic of an operating system associated with the UFS driver.

19. The method of claim 11, wherein the storage transaction is associated with a read-write request, or the storage transaction is associated with a data transfer.

20. A non-transitory computer-readable medium storing a set of instructions for wireless communication, the set of instructions comprising:

one or more instructions that, when executed by one or more processors of a universal flash storage (UFS) controller, cause the UFS controller to:

receive, from a UFS driver, a command associated with a storage transaction for an application that runs on a processor;

identify, from the command, a data transfer size associated with the command;

identify, from a register, a power management quality of service (PM-QoS) control data transfer size;

send, to the processor, a PM-QoS processor vote based at least in part on the data transfer size associated with the command in relation to the PM-QoS control data transfer size, wherein the PM-QoS processor vote prevents the processor from entering a low power state until the storage transaction is completed;

send, to a UFS storage device, the command; and receive, from the UFS storage device, a response indicating that the command has been executed and that the storage transaction has been completed.

* * * * *